P. FERRARI & E. MIGLIOLI.
COMBINED HYDROAEROPLANE AND SUBMERGIBLE CRAFT.
APPLICATION FILED MAR. 7, 1918.
1,288,860.
Patented Dec. 24, 1918.
5 SHEETS—SHEET 3.
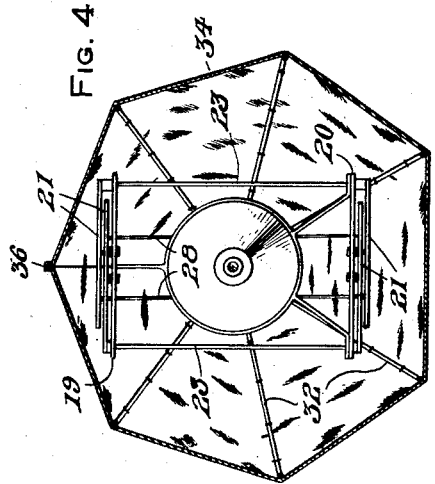
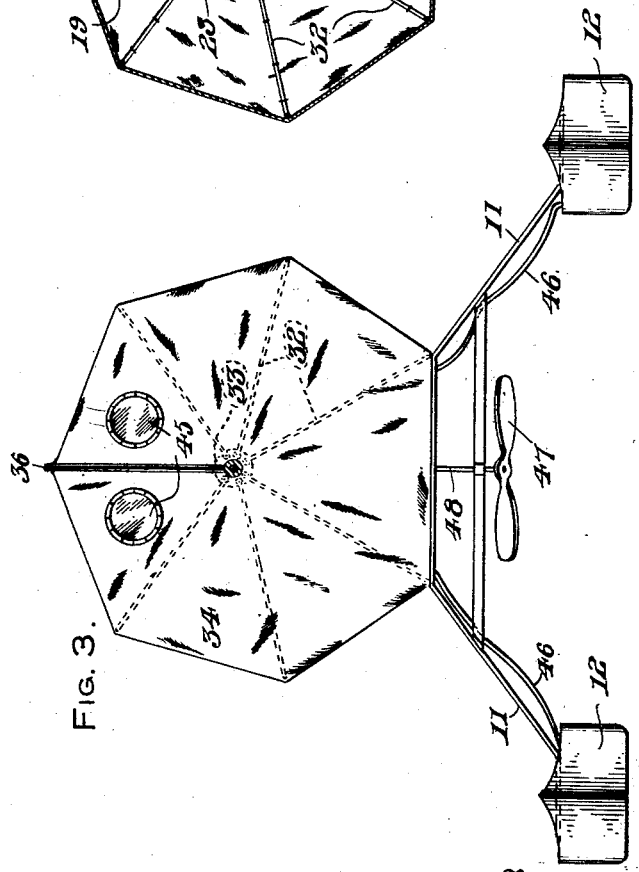
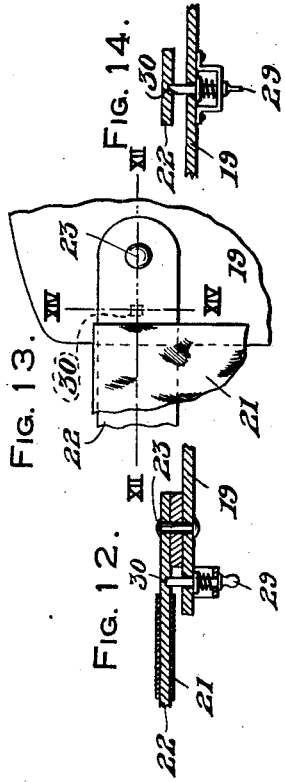
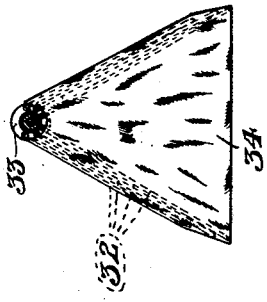
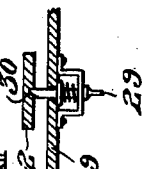
Inventors
P. Ferrari
E. Miglioli
By
Attorney P. FERRARI & E. MIGLIOLI.
COMBINED HYDROAEROPLANE AND SUBMERGIBLE CRAFT.
APPLICATION FILED MAR. 7, 1918.
1,288,860.
Patented Dec. 24, 1918.
5 SHEETS—SHEET 4.
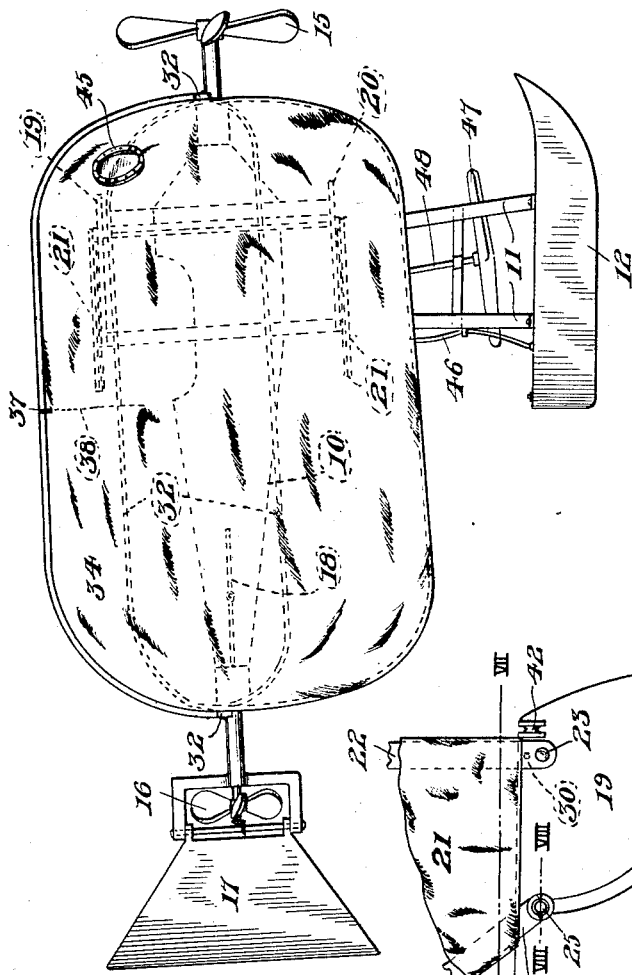
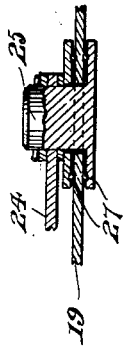
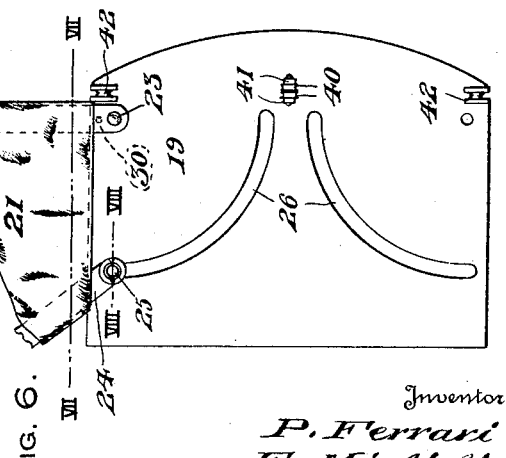
Inventors
P. Ferrari
E. Miglioli
By A. M. Wilson
Attorney

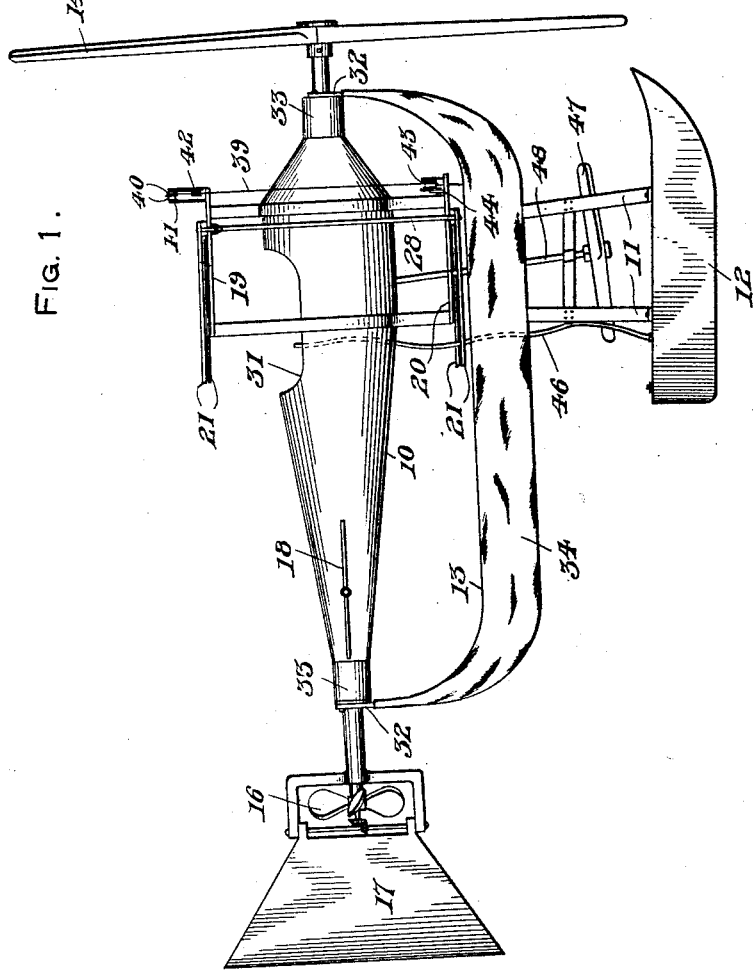

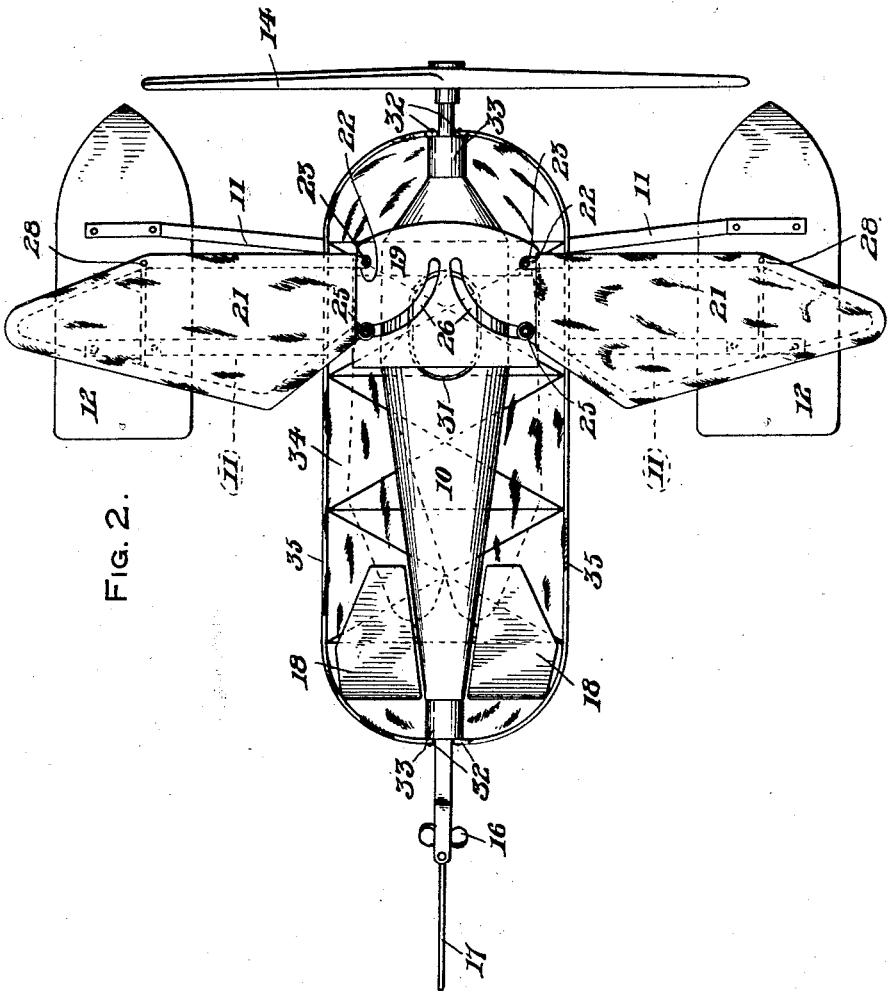

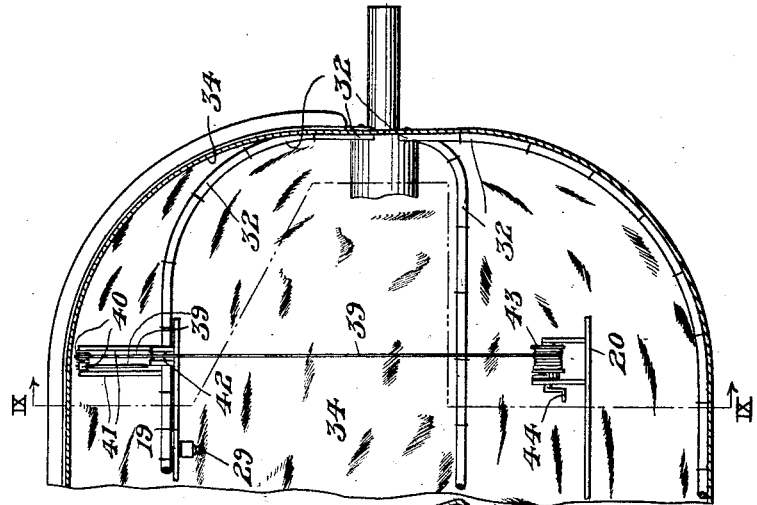

UNITED STATES PATENT OFFICE.

POLOMEDE FERRARI AND ENRICO MIGLIOLI, OF EAST BERLIN, CONNECTICUT.

COMBINED HYDROAEROPLANE AND SUBMERGIBLE CRAFT.

1,288,860. Specification of Letters Patent. Patented Dec. 24, 1918.

Application filed March 7, 1918. Serial No. 220,952.

*To all whom it may concern:*

Be it known that we, POLOMEDE FERRARI and ENRICO MIGLIOLI, subjects of the King of Italy, residing at East Berlin, in the county of Hartford and State of Connecticut, have invented certain new and useful Improvements in Combined Hydroaeroplanes and Submergible Craft, of which the following is a specification.

The primary object of the invention is the provision of a flying machine in the nature of a hydroaeroplane adapted for traveling at desired elevations in the air as well as upon the surface of the water, provision being made for submerging the device for traveling beneath the surface of the water.

A further object of the device is to provide in a single machine a submergible craft and a hydroaeroplane whereby traveling may be readily accomplished beneath and upon the water as well as through the air.

A still further object of the device is the provision of an aeroplane adapted for traveling upon the surface of the water when desired, arranged with foldable portions and a waterproof envelop for converting the same into a submergible craft, the same being submergible for traveling beneath the surface of the water and readily steered as well as propelled upon its course whether under or upon the water or in the air.

In the drawings forming a part of this application and in which like designating characters refer to corresponding parts throughout the several views, Figure 1 is a side elevation of the device arranged for use as an aeroplane or hydroaeroplane.

Fig. 2 is a top plan view thereof.

Fig. 3 is a front elevation of the same in its folded arrangement for use as a submergible craft with the propeller shaft shown in section.

Fig. 4 is a vertical transverse sectional view through the body of the device.

Fig. 5 is a side elevational view thereof with a different form of propeller.

Fig. 6 is an enlarged bottom plan view of the hinged portion of one of the elevating planes and wings and its mounting means.

Fig. 7 is a transverse sectional view taken upon line VII—VII of Fig. 6.

Fig. 8 is a sectional view upon an enlarged scale taken upon line VIII—VIII of Fig. 6.

Fig. 9 is an enlarged vertical transverse sectional view of the body of the device taken upon line IX—IX of Fig. 10.

Fig. 10 is a vertical longitudinal sectional view of an end portion thereof.

Fig. 11 is an elevational view of a portion of the canopy or covering member employed when open.

Fig. 12 is a sectional view of the retaining latch and adjacent parts taken upon line XII—XII of Fig. 13.

Fig. 13 is a top plan view of the hinged portion of one of the wing mounting braces, and Fig. 14 is a sectional view thereof taken upon line XIV—XIV of Fig. 13.

It being understood that the device is in the nature of a hydroaeroplane, which, when closed, is adapted for use as a submergible craft, the same broadly consists of a car or fuselage 10 of substantially torpedo shape mounted by means of legs 11 upon shoe-shaped floats 12 and by means of which the device is adapted to travel in floating arrangement upon the surface of the water, it being understood that a foldable envelop 13 modeled somewhat after the structure of a satchel or valise is adapted for inclosing the car 10 when the device is to be submerged. Moreover, the ribs 32 forming the frame for the envelop 13 support the car 10 upon the legs 11.

A forwardly arranged propeller 14 is provided for the car 10 to be employed when the device travels through the air either upon or above the surface of the water while the said propeller may be readily removed and a smaller propeller 15 substituted therefor when the device is used as a submergible craft. A rear propeller 16 is also provided for the car 10 as well as a vertical rudder 17 and opposite horizontal rudders 18, the latter only being employed, however, when the device is traveling through the air.

The aeroplane or bi-plane provides similar plates 19 and 20 positioned respectively above and below the car 10, each of the said plates having outwardly shiftable pairs of wings or planes 21 pivotally connected to their opposite outer edges at the sides of the device. A metal frame 22 is arranged for each wing 21 with one end of the frame pivoted as at 23 to its respective plate 19 or 20 while the other end 24 of the frame is provided with a stud 25 arranged through a curved slot 26 in the adjacent plate, antifriction bearings 27 being provided between the studs 25 and the said mounting plates 19 and 20.

From this arrangement it will be seen that the wings 21 at each side of the device may be readily swung inwardly and rearwardly in slightly overlapping relations as indicated by dotted lines in Fig. 2 of the drawings while the wings 21 may be again swung outwardly and forwardly to their outstretched operative positions when desired for use as indicated in Fig. 2 of the drawings. Braces 28 are connected between the frames 22 of the wings 21 at each side of the device so that either set of side wings will move together to either their closed or open positions when shifted by the operator. A spring pressed latch 29 is carried by each of the plates 19 and 20 for automatically engaging within a keeper socket 30 in the lower side of the adjacent wing frame 22 when the wings are outstretched and whereby the wings are locked in their operative arrangement until the said latches 29 are manually released.

It will be seen that when the device is employed for flying through the air, the wings 21 are maintained outstretched constituting aerofoils and sustaining the craft in its travel through the air, the same being drawn forwardly by the large propeller 14. The horizontal rudders 18 are shiftably arranged for guiding the craft upwardly or downwardly in its flight while the rudder 17 permits the craft to be steered laterally, it being understood that the pilot will be positioned in the well 31 of the car 10.

The device may descend for positioning the floats 12 upon the surface of the water and the propeller 14 is then employed for drawing the craft over the surface of the water and at which times the horizontal rudders 18 and rudders 17 are employed for steering purposes as well as for balancing the craft to best advantage for the traveling of the floats 12 upon the water.

The canopy 13 is provided with a frame formed of substantially semi-elliptical ribs 32 hingedly connected at their opposite ends to suitable rings 33 adjacent the ends of the car 10, flexible covering material 34 being arranged over the said ribs so that by swinging the ribs upwardly and contacting the marginal ribs 35 together, the envelop 13 will form a complete inclosure for the car 10. One of the edge ribs 35 is provided with a packing member 36 whereby the joint formed between the ribs 35 will be watertight when the envelop 13 is closed, any suitable latching means 37 being arranged for retaining the envelop in its closed arrangement, a suitable releasing cord 38 being preferably provided therefor positioned within the envelop.

Arrangement is made for closing the envelop 13 consisting of ropes 39 attached to the edge ribs 35 and running in opposite directions from pulleys 40 carried by a post 41 upon the upper plate 19 and thence over corner pulleys 42 carried by the said upper plate and to winding drums 43 upon the lower plate 20. It will be seen that by turning the drums 43 by means of the cranks 44 that the ropes 39 are wound up and the edge ribs 35 thereby moved upwardly and forced together with the canopy 13 in its closed arrangement and the catch 37 retaining the device closed. Upon pulling the cord 38, the canopy will automatically open when the drums 43 are released, this action being accomplished by reason of the weight of the edge ribs 35 and the fabric 34.

Port holes or windows 45 are positioned in the forward portion of the canopy 13 for employment when the canopy is closed in steering the device, it being understood that the floats 12 being hollow are adapted to be filled with fluid through a pipe 46 when it is desired to submerge the device. When the craft is floating upon the water, the floats 12 are filled with fluid through the pipes 46 which causes the floats 12 to lower in the water until a propeller 47 which is arranged beneath the canopy 13 between the legs 11 is submerged and whereupon the operation of the propeller 47 will cause the craft to descend through the water. The floats 12 may have fluid supplied thereto and removed therefrom by any suitable means, such as by having a reversible pump connected with the pipes 46 in the body 10 and operated by suitable gearing to the motor of the craft, it being noted that the free end portions of said pipes 46 may, in that case, be of sufficient length to reach from the body 10 into the water upon which the craft may be traveling to obtain the required supply of fluid. It will be noted that if the open free ends of pipes 46 are not placed in the water, air will then be supplied to the floats 12, and when water is supplied to said floats, the air may escape therefrom through suitable relief valves 12'. The shaft 48 of the propeller 47 is forwardly inclined for tilting the said propeller 47 so that its operation draws the craft slightly forwardly as well as downwardly, it being understood, however, that the smaller forward propeller 15 and the rear propeller 16 may be simultaneously operated for drawing the craft forwardly through the water when submerged in this manner. The rudder 17 is employed for steering the craft while the three propellers 15, 16 and 47 may be independently operated in either direction desired for controlling the movements of the craft through the water, the propeller 47 being utilized for completely submerging the device. The supply of air or water interchangeably in the floats 12 may be regulated by means of the conducting pipes 46, the weighing fluid being supplanted by air when the submarine reaches the surface of the water for assisting the floats 12 in rising to their position upon the surface thereof. The air propeller 14 is preferably of a foldable type for storing within the canopy 13 when the device is mounted upon the water prior to the closing of the canopy when it is to be submerged.

The device is adapted for universal use as well as for employment in time of war, it being possible for an aviator to fly through the air and to descend upon the surface of the water and shortly thereafter to entirely submerge within the water for traveling short distances out of the sight of the enemy.

What we claim as new is:—

1. A device of the class described comprising a motor driven car, mounting plates above and below the same, pairs of folding wings pivoted to said plates adapted for outstretched arrangement in bi-plane formation when the device is arranged as an aircraft, retaining means for the wings, pontoons secured beneath the car and a folding envelop for the car adapted for closed arrangement with the wings positioned therein when the wings are folded.

2. In combination with a motor driven fuselage, oppositely pivoted folding wings carried thereby adapted for positioning in bi-plane arrangement, a canopy frame mounted beneath the fuselage, pontoons attached beneath the said frame, a folding envelop upon said frame adapted for closing around the fuselage and wings when the wings are folded, and closing means for the canopy.

3. In combination with a motor driven fuselage, oppositely pivoted folding wings carried thereby adapted for positioning in bi-plane arrangement, a canopy frame mounted beneath the fuselage, pontoons attached beneath the said frame, an envelop upon said frame adapted for closing around the fuselage and wings when the wings are folded, closing means for the canopy, means for filling the pontoons with water when the device is to be used as a submergible craft, and downwardly propelling means for the device positioned in tilted arrangement beneath the fuselage.

4. In combination with a car body, plates arranged above and beneath the body having pairs of arcuate slots therein, a pair of wings pivoted to the outer sides of each plate, journaling means for each wing slidably positioned within the said slots whereby the wings are adapted for shifting inwardly adjacent the car from their operative outstretched positions, retaining connections for the wings and plates when the wings are outstretched, propelling means for the body, a canopy frame arranged beneath the car body attached to the opposite ends thereof, an envelop carried by said frame adapted for closing entirely surrounding the car and the wings when folded, means carried by said plates adapted for closing the canopy and a lowering propeller positioned beneath the canopy.

5. In combination with a car body, plates arranged above and beneath the body having pairs of arcuate slots therein, a pair of wings pivoted to the outer sides of each plate, journaling means for each wing slidably positioned within the said slots whereby the wings are adapted for shifting inwardly adjacent the car from their operative outstretched positions, retaining connections for the wings and plates when the wings are outstretched, propelling means for the body, a canopy frame arranged beneath the car body attached to the opposite ends thereof, an envelop carried by said frame adapted for closing entirely surrounding the car and the wings when folded, means carried by said plates adapted for closing the canopy, a lowering propeller positioned beneath the canopy, legs secured beneath the frame, hollow pontoons attached to said legs, means for filling the said pontoons with air or water at will and forwardly positioned windows in the said canopy.

6. A device of the class described comprising a car, mounting plates secured above and beneath the same, a pair of connected wings pivoted to corresponding lateral sides of said plates inwardly foldable in partially overlapping arrangement above and beneath the car, retaining means for the wings when outstretched, vertical and horizontal rudders operatively carried by the car, operating propellers for the car, a folding envelop and frame for and carried by the car, legs attached beneath the said frame and floats provided for said legs adapted for supporting the device in floating arrangement upon the water.

In testimony whereof we affix our signatures.

POLOMEDE FERRARI.
ENRICO MIGLIOLI.

Copies of this patent may be obtained for five cents each, by addressing the "Commissioner of Patents, Washington, D. C."